Feb. 6, 1968   MASAYUKI KUWAHARA   3,367,532
RECEPTACLE EQUIPPED WITH A DEVICE PREVENTING ITS LID
FROM FALLING OFF INADVERTENTLY
Filed Jan. 27, 1966
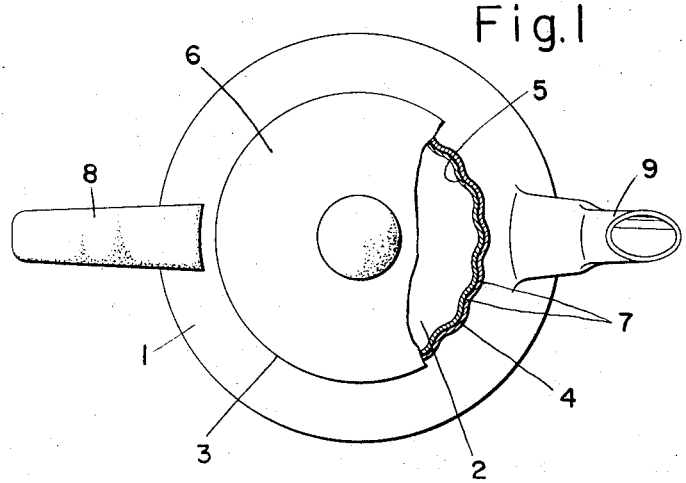
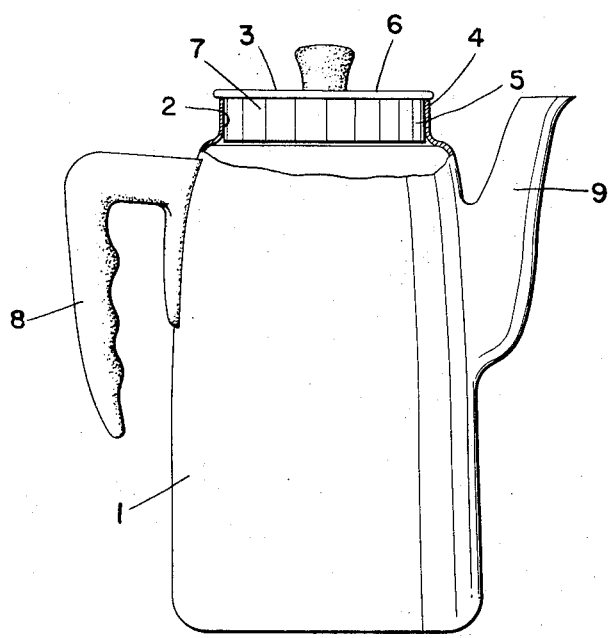
INVENTOR.
Masayuki Kuwahara

United States Patent Office 3,367,532
Patented Feb. 6, 1968

3,367,532
RECEPTACLE EQUIPPED WITH A DEVICE PREVENTING ITS LID FROM FALLING OFF INADVERTENTLY
Masayuki Kuwahara, 1074 Bodai-cho, Takabatake, Nara, Japan
Filed Jan. 27, 1966, Ser. No. 523,374
Claims priority, application Japan, Dec. 23, 1965, 40/79,730
1 Claim. (Cl. 220—55.1)

ABSTRACT OF THE DISCLOSURE

A receptacle having a pouring spout thereon and adapted to be tilted to pour the contents of the receptacle through the pouring spout, said receptacle having an opening in the top thereof with a skirt around the opening depending downwardly into the receptacle, said skirt having undulations along the length thereof, and a removable lid covering the opening and having a depending flange having undulations along the length thereof with the same contour as the undulations in the depending skirt and in sliding engagement with the depending skirt, whereby when the receptacle is tilted the cover is retained in position in the opening.

---

The aim of this invention consists in a device preventing the lid fitted to the opening of the receptacle, for example, a pot, from easily slipping off therefrom, by providing waving indentations along the contact surfaces of both the receptacle and the lid so that the said lid will not easily come off when the receptacle is tilted.

A great many devices have recently been introduced to prevent the lid fitted to the opening of the receptacle from easily slipping off when the receptacle is tilted, but none of them has been free from demerits in some respect or other.

The traditional method so far resorted to for this purpose has been to prevent the lid from easily falling off by making the projection or dent provided on the rim of the opening of the receptacle or the lid engage each other, or by inserting the projection provided on the receptacle or the lid into the curved groove on the lid or the receptacle by turning the lid. In case of such devices, however, it is impossible to fit the lid into the opening of the receptacle unless the projection and the dent are well matched with each other. This necessarily involves some difficulty and trouble in the inserting operation, and the lid is apt to be carelessly put on the opening without making the projection and the dent engage each other, as a result of which, when the receptacle is tilted, the lid often comes off from the opening of the receptacle. Such devices, therefore, have a defect in that the slipping of the lid is liable to let the contents of the receptacle flow out unexpectedly or even give rise to a serious accident as a result.

This invention, on the other hand, provides an epochal device to prevent the lid from falling off by means of an extremely simple method, which has been worked out after a number of experiments.

This invention is characterized by the fact that waving indentations are formed on the contact surfaces of both the opening of the receptacle and the lid to be fitted thereto. The opening of the receptacle can be shaped round, square or into any other required form.

The particulars of this invention are illustrated by the attached figures. FIG. 1 shows a plane figure of the pot with a partial cross section, while FIG. 2 a lateral view of the said pot with a partial cross section.

As shown by the figures, the opening 2 of the body 1 of the pot forms a longitudinally cylindrical wall 4, to which is removably fitted the cylindrical body 5 of the lid 6 formed integrally and longitudinally from the rim of the top wall 3. On the contact surfaces of both the said cylindrical wall 4 and the cylindrical body 5, slowly waving indentations are longitudinally formed by means of the press or the like. The figure 8 indicates the handle of the body 1, while 9 represents the outlet equipped on one side of the body 1.

When the lid 6 is fitted into the opening 2 of the body 1, the cylindrical body 5 of the lid 6 is inserted inside the cylindrical wall which forms the said opening 2 and, moreover, on both the contact surfaces are formed the waving indentations 7 concentrically, the crests of the said indentations closely fitting in with the corresponding hollows respectively. As a rule, when the body 1 is tilted to let the contents inside the body 1 flow out of the outlet 9, the lid 6 is liable to slip off at the elevated part with the contact surface at the lowered part as a fulcrum. In case of this invention, however, the waving indentations formed on the contact surfaces of both the said cylindrical wall 4 and the cylindrical body 5 are closely fitted to each other, so that, though the lid is pulled away along the indentations 7 at the elevated side, the crests of the said indentations 7 at the lowered side bite into the corresponding hollows on the contact surface, and the sliding power thus produced works as a multilateral frictional resistance, preventing the lid 6 from falling off. The more the body 1 is tilted and the incline of the rim of the opening 2 is increased, the more the clutching between the lid 6 and the opening rim 2 of the receptacle is intensified, thus preventing the lid 6 from slipping off.

In this invention, as explained above, the contact surfaces of both the cylindrical body of the lid and the cylindrical wall of the opening rim of the body are provided with the waving indentations, so that when the receptacle is tilted, though the power acts on the lid to pull it off at the elevated side along the longitudinally formed indentations with those on the contact surface at the lowered side as a fulcrum, all the other contacting indentations except those at the elevated and lowered sides are subjected to the power to disengage in the directions gradually deflected from the proper direction of the indentations with the lowered side as a fulcrum. As a result, the indentations on the cylindrical body of the lid bite into and clutch at those on the cylindrical wall of the receptacle, preventing the lid from slipping off. This invention can thus realize the useful effect of preventing the lid from easily coming off even when the receptacle is tilted, holding the lid at the opening rim of the receptacle in a stablized state. Moreover, the device is so simple that it is suitable for mass production and supply at a low price.

Another feature of this invention lies in the fact that the contact surfaces of both the receptacle and the lid are uniformly indented, so that the lid can be fitted into the receptacle at any place by turning it only by the width of a single crest or hollow of the indentations, without the trouble of fitting a certain spot of the lid to a certain spot of the opening of the body. These indentations are not only free from the risk of impairing the appearance, but even have the ornamental effect with their slowly rising and falling waves. This device is applicable to pots and many other receptacles with removable lids.

What I claim is:

1. A receptacle having a pouring spout thereon and adapted to be tilted to pour the contents of the receptacle through the pouring spout, said receptacle having an opening in the top thereof with a skirt around the opening depending downwardly into the receptacle, said skirt having undulations along the length thereof, and a removable lid covering the opening and having a depending flange having undulations along the length thereof with the same contour as the undulations in the depending skirt and in sliding engagement with the depending skirt, whereby when the receptacle is tilted the cover is retained in position in the opening.

References Cited

FOREIGN PATENTS 730,214   3/1953   Great Britain.

THERON E. CONDON, *Primary Examiner.*

JAMES B. MARBERT, *Examiner.*